(12) United States Patent
Lonardelli

(10) Patent No.: US 10,750,843 B2
(45) Date of Patent: Aug. 25, 2020

(54) CELL PHONE HOLDER STAKE

(71) Applicant: David Lonardelli, Victorville, CA (US)

(72) Inventor: David Lonardelli, Victorville, CA (US)

( * ) Notice: Subject to any disclaimer, the term of this patent is extended or adjusted under 35 U.S.C. 154(b) by 0 days.

(21) Appl. No.: 16/196,522

(22) Filed: Nov. 20, 2018

(65) Prior Publication Data
US 2020/0154866 A1     May 21, 2020

(51) Int. Cl.
| | |
|---|---|
| *F16M 13/00* | (2006.01) |
| *A45F 3/44* | (2006.01) |
| *F16B 2/10* | (2006.01) |
| *F16B 2/00* | (2006.01) |
| *H04B 1/3877* | (2015.01) |
| *A45B 23/00* | (2006.01) |
| *F16B 1/00* | (2006.01) |

(52) U.S. Cl.
CPC ............... *A45F 3/44* (2013.01); *A45B 23/00* (2013.01); *F16B 1/00* (2013.01); *F16B 2/005* (2013.01); *F16B 2/10* (2013.01); *H04B 1/3877* (2013.01); *A45B 2023/0093* (2013.01); *F16B 2001/0035* (2013.01)

(58) Field of Classification Search
CPC .................................................. E04H 12/2215
USPC .................................................. 248/508, 156
See application file for complete search history.

(56) References Cited

U.S. PATENT DOCUMENTS

| | | | |
|---|---|---|---|
| 2,603,440 A * | 7/1952 | Le Vesconte | A45F 3/44 108/28 |
| 5,390,890 A * | 2/1995 | Ferguson | E04H 15/003 135/118 |
| 5,524,309 A * | 6/1996 | La Barbera | E04H 15/62 135/118 |
| 5,713,383 A * | 2/1998 | Ramirez | E04H 15/62 135/118 |
| 7,159,256 B1 * | 1/2007 | Licari | E04H 15/003 135/118 |
| 7,895,952 B2 | 3/2011 | Theinert | |
| 9,175,496 B2 | 11/2015 | Darquea | |
| 9,357,829 B1 | 6/2016 | Ikier | |
| 9,542,871 B1 * | 1/2017 | White | G09F 15/0075 |
| 9,689,176 B1 * | 6/2017 | Ovitt | E04H 15/62 |
| 9,808,091 B1 | 11/2017 | Goldszer | |
| 2002/0063195 A1 * | 5/2002 | Shaw | B60J 7/1621 248/354.1 |
| 2006/0257138 A1 | 11/2006 | Fromm | |
| 2014/0146526 A1 | 5/2014 | Evans, Sr. | |
| 2015/0041612 A1 * | 2/2015 | Kaplan | E04H 15/64 248/508 |

\* cited by examiner

*Primary Examiner* — Steven M Marsh

(57) ABSTRACT

A cellphone holder stake for supporting a cellphone on the beach includes a stake having a top end, a rounded bottom, and a shaft extending between the top end and the rounded bottom. The stake is configured to mount into soft ground such as sand. A mount attachment is coupled to the stake and is selectively engageable with the top end of the stake. A cellphone mount is coupled to the mount attachment. The cellphone mount is configured to secure a cellphone.

8 Claims, 7 Drawing Sheets

CELL PHONE HOLDER STAKE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to cellphone holders and more particularly pertains to a new cellphone holder for supporting a cellphone on the beach.

BRIEF SUMMARY OF THE INVENTION

An embodiment of the disclosure meets the needs presented above by generally comprising a stake having a top end, a rounded bottom, and a shaft extending between the top end and the rounded bottom. The stake is configured to mount into soft ground. A mount attachment is coupled to the stake and is selectively engageable with the top end of the stake. A cellphone mount is coupled to the mount attachment. The cellphone mount is configured to secure a cellphone.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
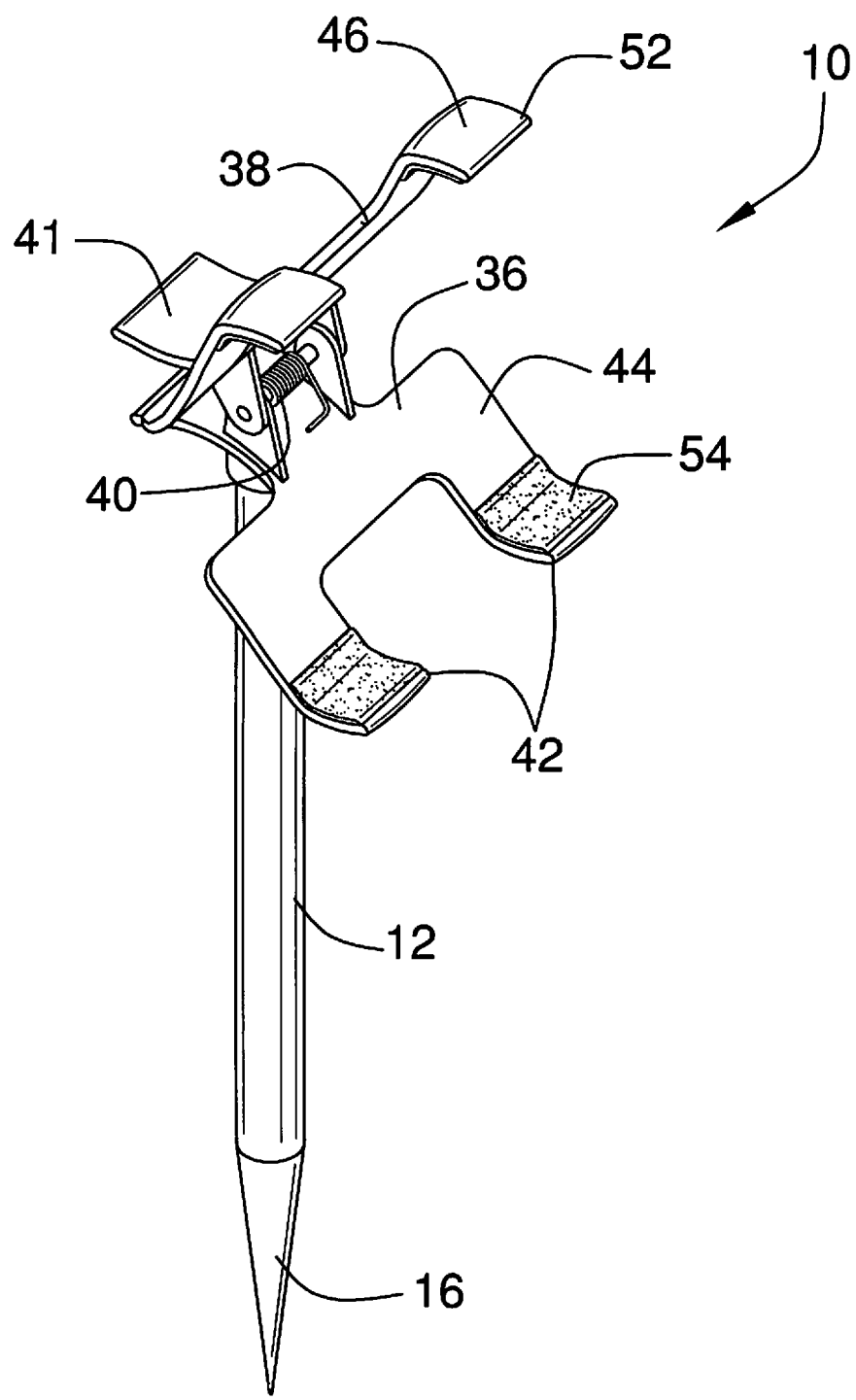
FIG. 1 is an isometric view of a cellphone holder stake according to an embodiment of the disclosure.
Figure 2:
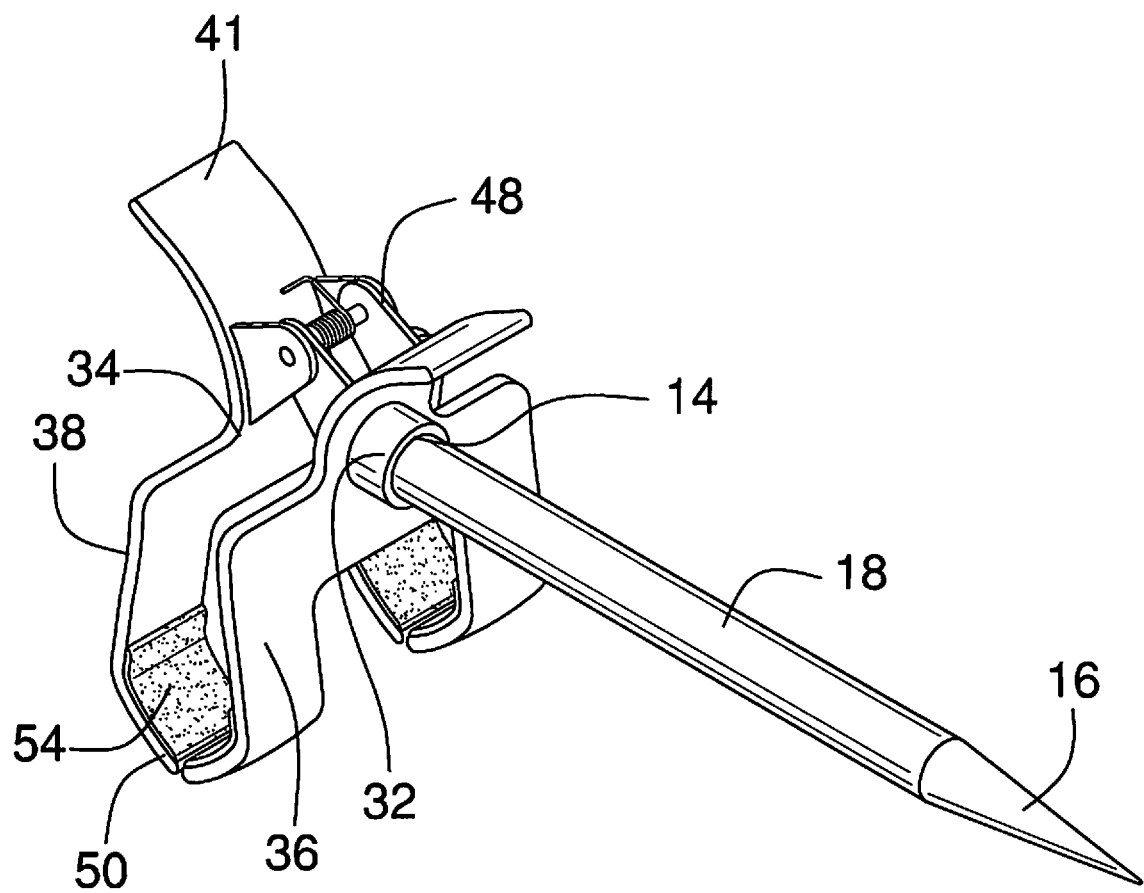
FIG. 2 is an isometric view of an embodiment of the disclosure.
Figure 3:
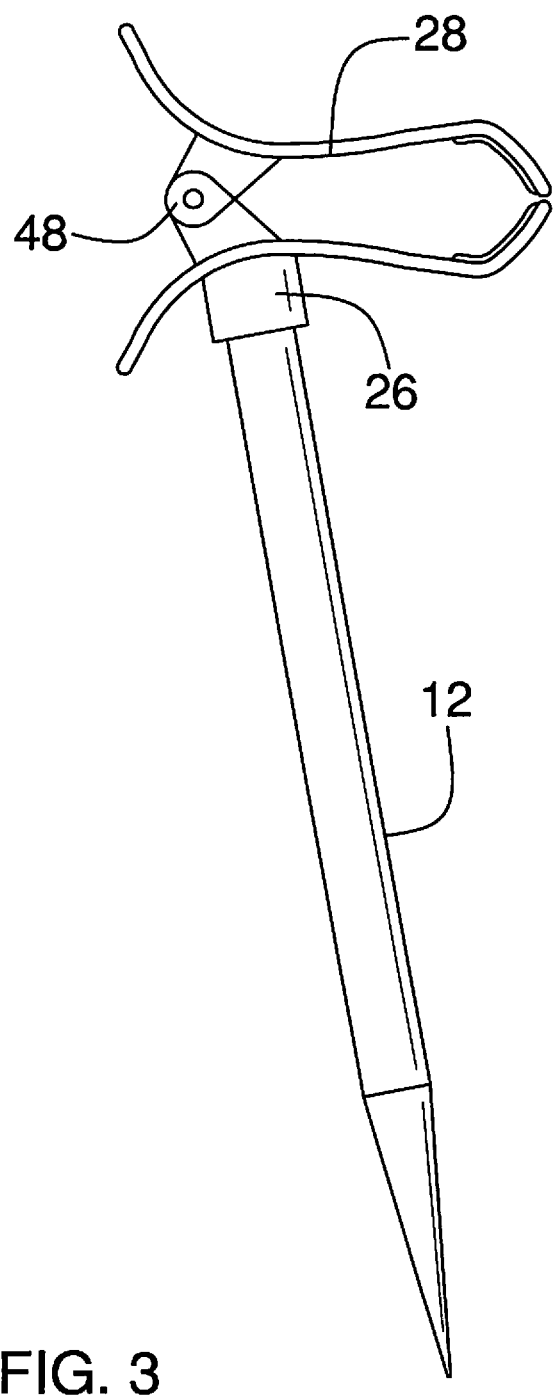
FIG. 3 is a side elevation view of an embodiment of the disclosure.
Figure 4:
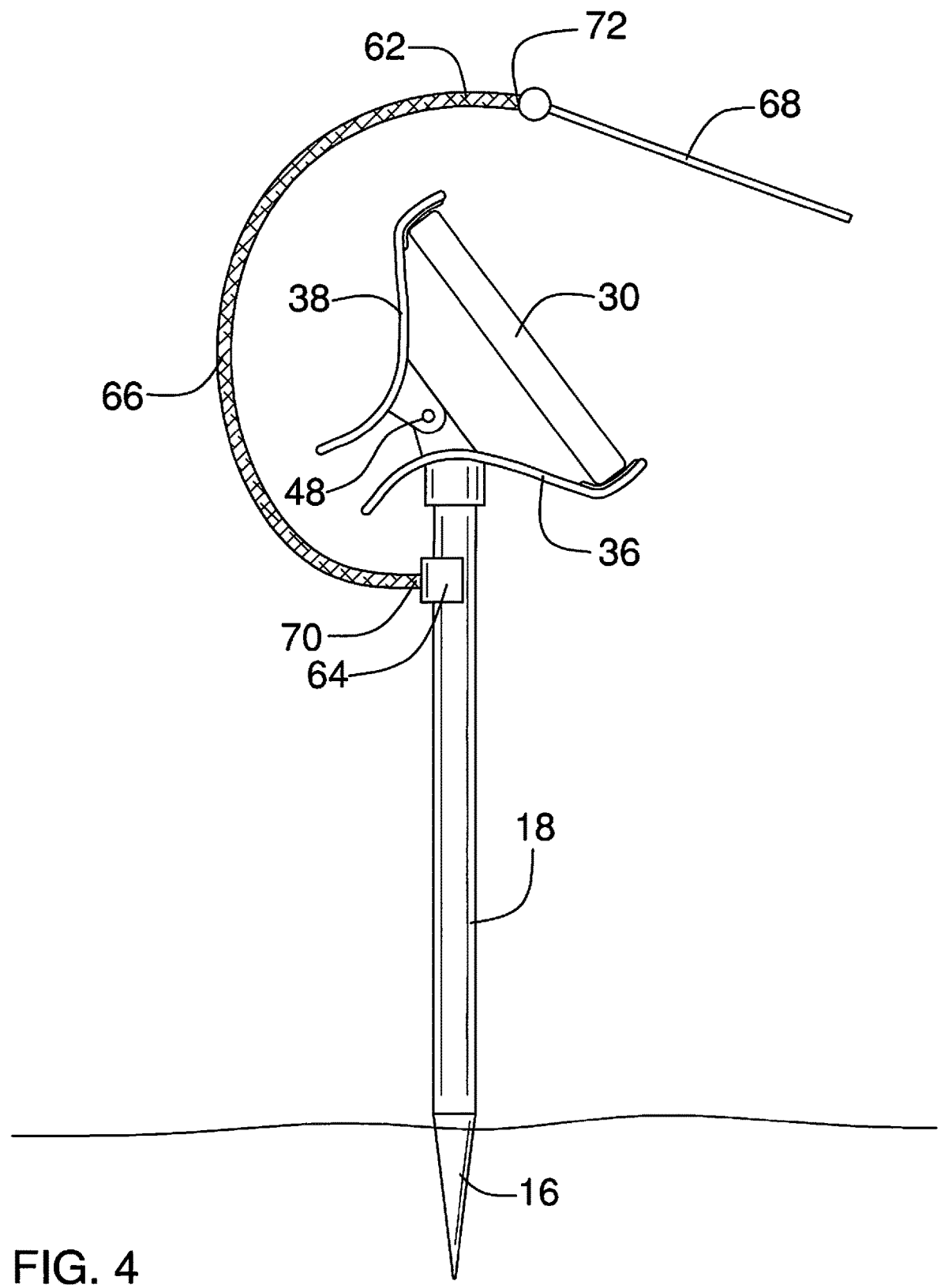
FIG. 4 is an in-use view of an embodiment of the disclosure.
Figure 5:
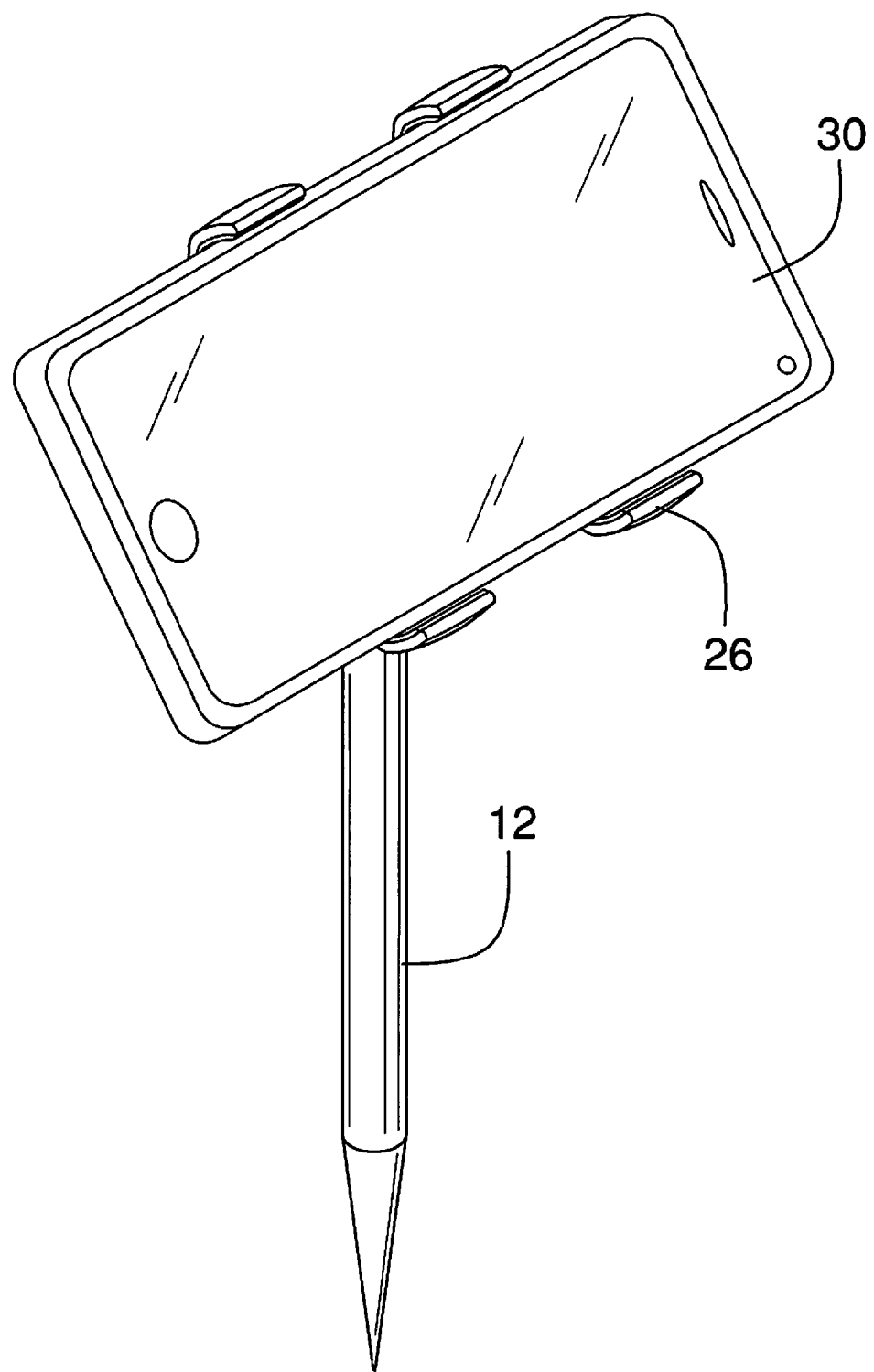
FIG. 5 is an in-use view of an embodiment of the disclosure.
Figure 6:
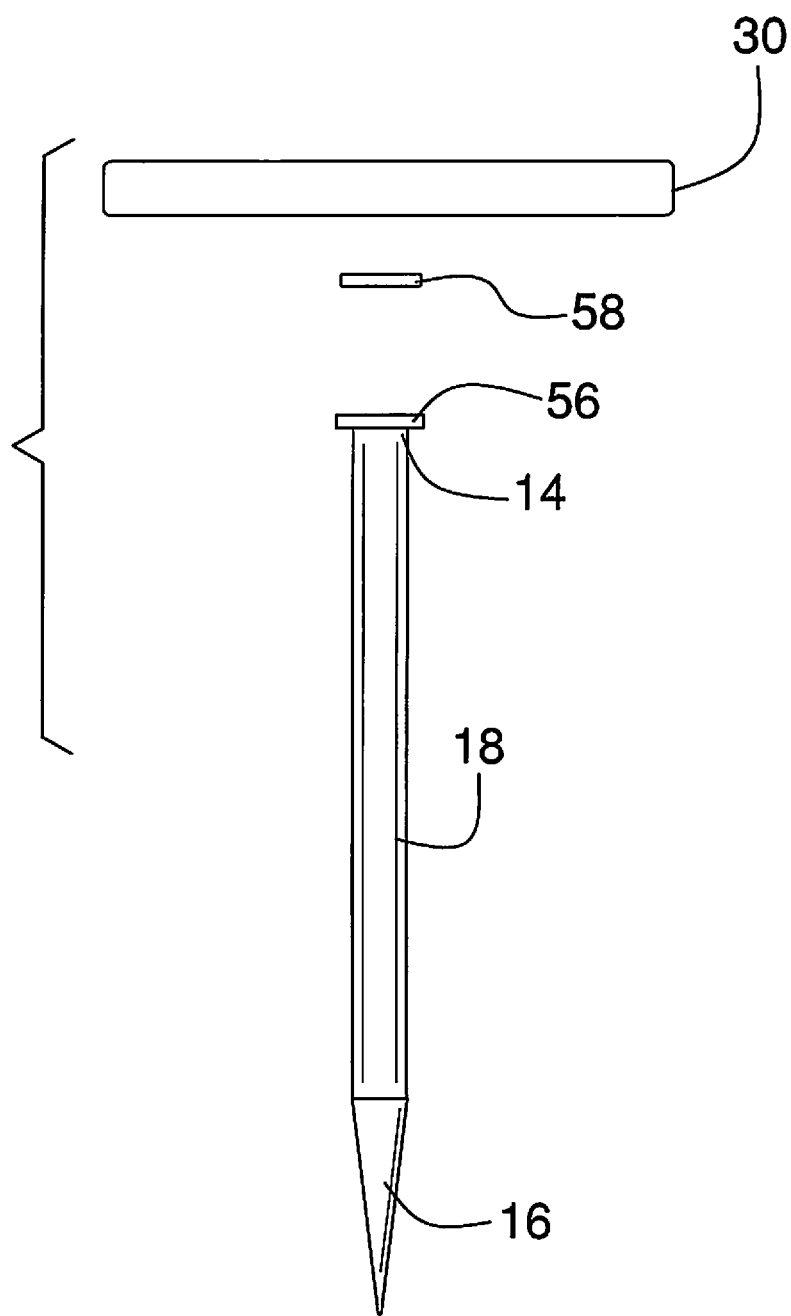
FIG. 6 is a side elevation view of an embodiment of the disclosure.
Figure 7:
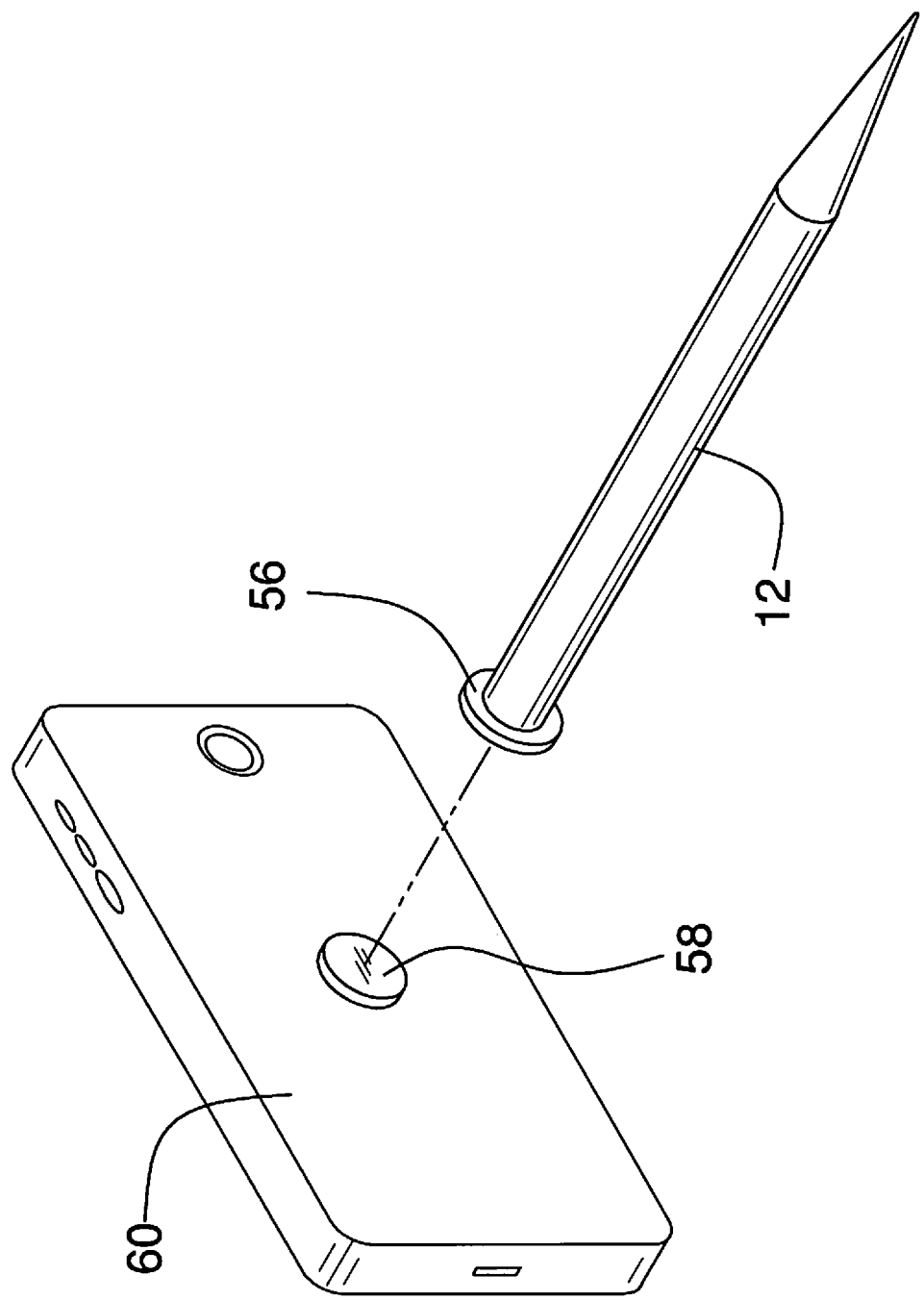
FIG. 7 is an isometric view of an embodiment of the disclosure.

With reference now to the drawings, and in particular to FIGS. 1 through 7 thereof, a new cellphone holder embodying the principles and concepts of an embodiment of the disclosure and generally designated by the reference numeral 10 will be described.

As best illustrated in FIGS. 1 through 7, the cellphone holder stake 10 generally comprises a stake 12 having a top end 14, a rounded bottom 16, and a shaft 18 extending between the top end 14 and the rounded bottom 16. The rounded bottom 16 is coupled to the shaft 18. The stake 12 is configured to mount into soft ground such as sand to elevate the top end 14. A flange 24 may be coupled to the stake 12. The flange 24 is coupled to the inner rod 22 adjacent the rounded bottom 16 to prevent the rounded bottom 16 from entering the outer sleeve 20.

A mount attachment 26 is coupled to the top end 14 of the stake. A cellphone mount 28 is coupled to the mount attachment 26. The cellphone mount 28 is configured to secure a cellphone 30. The mount attachment 26 may be a collar 32 and the cellphone mount 28 may be a clamp 34. The collar 32 is coupled to the top end 14 of the stake. The clamp 34 comprises a lower half 36, an upper half 38, and a spring 40. Each of the lower half 36 and the upper half 38 may have a butt-end 41, a pair or fingers 42, an inside face 44, an outside face 46, and a pivot 48. The pivot 48 of the upper half 38 is coupled to the pivot 48 of the lower half 36. The spring 40 is coupled around the pivot 48 of each of the upper half 38 and the lower half 36 and engages the butt-end 41 of each of the upper half 38 and the lower half 36. The clamp 34 has a closed position 50 and an alternate open position 52. The spring 40 squeezes the upper half 38 and the lower half 36 towards the closed position 50 and secures the cellphone 30 in the alternate open position 52. A plurality of rubber pads 54 may be coupled to the inside face 44 on the pair of fingers 42 of each of the lower half 36 and the upper half 38. The plurality of rubber pads 54 is configured to grip and protect the cellphone 30. The mount attachment 26 may alternatively be a first magnet 56 coupled to the top end 14 of the stake. The cellphone mount 28 may alternatively be a second magnet 58. The second magnet 58 is selectively engageable with the first magnet 56 and is configured to be coupled to a backside 60 of the cellphone 30.

There may be a shade attachment 62 comprising a stake clip 64, a flexible stem 66, and a shade panel 68. The stake clip 64 is selectively engageable with the shaft 18 of the stake. The flexible stem 66 has a proximal end 70 and a distal end 72 with the proximal end 70 coupled to the stake clip 64. The shade panel 68 is coupled to the distal end 72 of the flexible stem to cast a shadow over the cellphone 30 to prevent the cellphone 30 from overheating and to reduce glare.

In use, the shaft 18 is partially inserted into the ground. The butt-end 41 of each of the upper half 38 and the lower half 36 are squeezed to move the clamp 34 to the alternate open position 52 to receive the cellphone 30. The shade attachment 62 may be attached to the stake 12 and the flexible stem 66 is manipulated to position the shade panel 68 above the cellphone 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cellphone holder stake comprising:
   a stake, the stake having a top end, a pointed bottom, and a shaft extending between the top end and the pointed bottom, the stake being configured to mount into soft ground, the shaft of the stake comprising an outer sleeve and an inner rod, the inner rod being slidably engageable within the outer sleeve, the pointed bottom being coupled to the inner rod, the stake being telescopable;
   a mount attachment means coupled to the stake, the mount attachment means being coupled to the top end of the stake;
   a cellphone mount means coupled to the mount attachment means, the cellphone mount means being configured to secure a cellphone; and
   a shade attachment, the shade attachment comprising
      a stake clip, the stake clip being selectively engageable with the shaft,
      a flexible stem coupled to the stake clip, the flexible stem having a proximal end and a distal end, the proximal end being coupled to the stake clip, and
      a shade panel coupled to the flexible stem, the shade panel being coupled to the distal end of the flexible stem, wherein the shade panel casts a shadow over the cellphone.

2. The cellphone holder stake of claim 1 further comprising a flange coupled to the stake, the flange being coupled to the inner rod adjacent the pointed bottom, the flange preventing the pointed bottom from entering the outer sleeve.

3. The cellphone holder stake of claim 1 further comprising the mount attachment means being a collar, the collar being coupled to the top end of the stake.

4. The cellphone holder stake of claim 1 further comprising the cellphone mount means being a clamp, the clamp comprising a lower half, an upper half, and a spring, the upper half being hingeably coupled to the lower half, the clamp having a closed position and an alternate open position, the spring being coupled between the upper half and the lower half, the spring squeezing the upper half and the lower half towards the closed position and securing the cellphone in the open position.

5. The cellphone holder stake of claim 1 further comprising each of the lower half and the upper half having a butt-end, a pair or fingers, an inside face, an outside face, and a pivot, the pivot of the upper half being coupled to the pivot of the lower half, the spring being coupled around the pivot of each of the upper half and the lower half and engaging the butt-end of each of the upper half and the lower half.

6. The cellphone holder stake of claim 5 further comprising a plurality of rubber pads coupled to the clamp, the plurality of rubber pads being coupled to the inside face on the pair of fingers of each of the lower half and the upper half, the plurality of rubber pads being configured to grip and protect the cellphone.

7. The cellphone holder stake of claim 1 further comprising the mount attachment means being a first magnet coupled to the stake, the first magnet being coupled to the top end of the stake, the cellphone mount means being a second magnet, the second magnet being selectively engageable with the first magnet, the second magnet being configured to be coupled to a backside of the cellphone.

8. A cellphone holder stake comprising:
   a stake, the stake having a top end, a pointed bottom, and a shaft extending between the top end and the pointed bottom, the shaft comprising an outer sleeve and an inner rod, the inner rod being slidably engageable within the outer sleeve, the pointed bottom being coupled to the inner rod, the stake being telescopable, the stake being configured to mount into soft ground;
   a flange coupled to the stake, the flange being coupled to the inner rod adjacent the pointed bottom, the flange preventing the pointed bottom from entering the outer sleeve;
   a collar, the collar being coupled to the top end of the stake;
   a clamp, the clamp comprising a lower half, an upper half, and a spring, each of the lower half and the upper half having a butt-end, a pair or fingers, an inside face, an outside face, and a pivot, the pivot of the upper half being coupled to the pivot of the lower half, the spring being coupled around the pivot of each of the upper half and the lower half and engaging the butt-end of each of the upper half and the lower half, the clamp having a closed position and an alternate open position, the spring squeezing the upper half and the lower half towards the closed position and securing the cellphone in the open position;
   a plurality of rubber pads coupled to the clamp, the plurality of rubber pads being coupled to the inside face on the pair of fingers of each of the lower half and the upper half, the plurality of rubber pads being configured to grip and protect the cellphone; and
   a shade attachment, the shade attachment comprising:
      a stake clip, the stake clip being selectively engageable with the shaft;

a flexible stem coupled to the stake clip, the flexible stem having a proximal end and a distal end, the proximal end being coupled to the stake clip; and a shade panel coupled to the flexible stem, the shade panel being coupled to the distal end of the flexible stem, wherein the shade panel casts a shadow over the cellphone.

\* \* \* \* \*